United States Patent [19]
Hirschberger

[11] Patent Number: 5,221,540
[45] Date of Patent: Jun. 22, 1993

[54] EXTRUSION HEAD WITH ADJUSTABLE VIEW STRIPE POSITIONING

[75] Inventor: Michael Hirschberger, Sylvania, Ohio

[73] Assignee: Hoover Universal, Inc., Plymouth, Mich.

[21] Appl. No.: 899,877

[22] Filed: Jun. 17, 1992

[51] Int. Cl.5 .............................................. B29C 49/04
[52] U.S. Cl. ............................. 425/131.1; 425/133.1; 425/532
[58] Field of Search ............ 425/532, 523, 467, 131.1, 425/133.1

[56] References Cited

U.S. PATENT DOCUMENTS

| 4,548,569 | 10/1985 | Pitigliano et al. | 425/133.1 |
| 4,609,340 | 9/1986 | Irwin et al. | 425/532 |
| 4,657,497 | 4/1987 | Dehennau et al. | 425/133.1 |
| 4,802,833 | 2/1989 | Shapler | 425/131.1 |
| 4,890,994 | 1/1990 | Shapler et al. | 425/131.1 |
| 5,046,938 | 9/1991 | Hirschberger | 425/133.1 |
| 5,102,602 | 4/1992 | Ziegler | 425/532 X |
| 5,116,215 | 5/1992 | Hsu | 425/532 X |

Primary Examiner—Richard L. Chiesa
Attorney, Agent, or Firm—Harness, Dickey & Pierce

[57] ABSTRACT

An extrusion head assembly for adjustably positioning a view stripe in a tubular parison to correct the view stripe positioning in situations where twisting of the parison prior to molding occurs. The apparatus includes an externally adjustable member which circumferentially positions the view stripe in the parison relative to the extrusion head assembly so that the view stripe will correspond with the mold parting line of a container blow molded from the parison. The adjustable member circumferentially positions the view stripe without causing the development of stagnation pockets in the stream of the plastic forming the view stripe. Degregation is prevented by dividing the flow of the plastic forming the view stripe into two streams which individually and continuously flow from a common inlet port to a common exit port.

14 Claims, 2 Drawing Sheets

EXTRUSION HEAD WITH ADJUSTABLE VIEW STRIPE POSITIONING

BACKGROUND AND SUMMARY OF THE INVENTION

This invention generally relates to blow molding machines and more particularly, to an extrusion head having a rotational adjustment for aligning a view stripe in a parison so as to correspond with the mold parting line on a blown container.

Plastic containers, such as motor oil containers, are generally made of an opaque and colored plastic resin. The color of the container generally provides product identification to the consumers. A disadvantage of these opaque containers is that, during use, it is not possible for the consumer to visually monitor the level of the contents remaining in the container. One solution for ascertaining the remaining content amount is to form a vertical stripe, made of a translucent plastic resin, in the side wall of the container through which the content level can be viewed. These vertical stripes are more commonly known as view stripes.

Typically, the container is round, square or rectangular and is provided with a view stripe that corresponds with or is formed on the mold parting line of the blown container. One benefit of locating the view stripe on the parting line of a generally rectangular or square container is that it enables the container to be manufactured with the view stripe confined to the narrow side walls. This also avoids having the view stripe extend through the front and back side walls, which may carry labels for product identification, and through the top and bottom of the container where, in many cases, the view stripe is useless. Regardless of whether the container is rectangular or round, the view stripe must be positioned so that it is not formed into the volume level markings on the surface of the mold cavity.

U.S. Pat. No. 4,802,833, commonly assigned to the assignee of the present invention, discloses an accumulator head in a blow molding machine for producing plastic storage drums having vertical view stripes in their side walls. U.S. Pat. No. 4,890,994, also commonly assigned to the assignee of the present invention, discloses an apparatus for forming a view stripe in a parison and in which the view stripe is restricted to the side wall of the blown container. These prior patents tend to be directed toward intermittent extrusion processes. The present invention, however, is mainly directed toward use with continuous extrusion machines.

While the view stripe is originally aligned so that it will correspond with the mold parting line of the container, certain mold styles, in particular the book style molds that are used with certain continuous wheel style extrusion blow molding machines, have been found to cause the parison and the view stripe to rotate during the non-symmetrical closing of the mold halves prior to blow molding. Unfortunately, when designing blow molding machines it is practically impossible to predict the amount of rotation which will be experienced by the parison during the closing of the molds. Furthermore, changing of the molds themselves and molding a different container will often result in a change in the amount of parison rotation that occurs during closing of the mold. Regardless of how the rotation occurs, when the rotated parison is blow molded, the position of the view stripe will deviate from the mold parting line of the blown container. If the degree of departure from the mold parting line is great enough, the resulting view stripe will not only be formed off of the mold parting line, but will also be formed over the volume level markings or indicia on the container side wall. Additionally, if the view stripe is formed off of the mold parting line, the view stripe will exhibit a visible "bend" as it passes from the side wall into the upper and lower container walls. For aesthetic reasons, it can be seen that it is desirable to maintain the view stripe restricted to the side walls and particularly the mold parting line thereby preventing the view stripe from being formed over the volume level markings or deviating from a straight line as it breaks onto the top/bottom walls.

It is therefore an object of this invention to provide an apparatus for maintaining the position of the view stripe on the mold parting line of the blown container. It is a further object of this invention to provide an apparatus which has the ability to adjust the position of the view stripe, relative to the mold halves, being formed in a parison to accommodate shifting and rotation of the parison during non-symmetrical closing of the mold halves.

A further object of this invention is to accomplish the above objects while eliminating stagnation pockets in the flow of the plastic resin which would result in degregation of the plastic forming the parison. Typically, stagnation pockets form in corners, dead ends and abrupt direction changes. One challenge which needed to be overcome by this invention was to provide the above mentioned adjustability while streamlining the flow of resin and eliminating substantially all areas where stagnation pockets could develop, including corners, dead ends and abrupt direction changes in the adjustment mechanism itself.

In achieving the above objects, the apparatus of this invention is typically utilized in a single cavity extrusion head assembly. However, a multi-cavity assembly might alternatively be employed. The parison is formed from two plastic resins, a primary resin and a secondary resin, with the view stripe longitudinally extending in the wall of the parison. The primary resin is pigmented and opaque. The secondary resin is unpigmented and translucent, but often is of the same or a similar type of resin as the primary resin.

While in a molten state, the primary and secondary resins are individually fed into the interior cavity of the extrusion head. The flow of the primary resin is divided into two flow streams which progress in opposite directions around a mandrel sleeve, positioned within the primary cavity of the extrusion head, and are then rejoined. A diverter, formed on the mandrel sleeve, directs the flow stream from a generally horizontal direction to a generally downward direction. The primary resin flow moves through length of the cavity sufficient to eliminate substantially all aspects of rotational flow thereby leaving only an axial component to the flow direction. As the primary resin moves downward, a vertical division is caused to be formed in the primary resin flow.

The secondary, unpigmented resin is fed into the extrusion head and is first directed into a circular flow passage located on the adjustment ring of the assembly. At the entrance of the circular flow passage, the secondary resin is divided into two flows which proceed around opposite sides of the circular flow passage until being rejoined and directed downward into a flow passage having a exit port. The exit port is circumferentially adjustable by virtue of it being formed in the rotatable adjustment ring. The exit port of the circular flow passage corresponds with the division in the primary resin flow and results in the secondary, unpigmented resin being inserted into the division of the primary resin flow. The opposing edges of secondary resin thus form welds joining with the divided portions of the primary resin flow.

As a result, a tubular parison is formed having an axial view stripe of a translucent resin in the wall of opaque resin. The circumferential position of the view stripe in the wall of the parison ca be readily altered by the adjustment ring to compensate for rotation or shifting of the parison caused during closing of the mold halves for blow molding. The actual mechanism for achieving this adjustment is provided externally of the extrusion head for convenience and ease of operation.

The formed tubular parison is extruded through an annular outlet in the bottom of the extrusion head. The mold halves of the blow molding machine are positioned below the parison outlet such that the mold halves can be closed upon the parison. By providing the extrusion head with a rotationally adjustable exit port for the secondary resin, the position of the view stripe in the parison can be varied to compensate for any rotation or shifting caused by the mold halves and thereby ensure correspondence of the view stripe with the mold parting line or any otherwise desirable location. As will be appreciated by the discussion more fully set out below, the specific structure of the present invention allows for positioning of view stripe to be accomplished without any significant degregation of the plastic resin occurring. The reduced degregation is attributable to the fact that while the secondary resin flow is divided into two streams, movement of each of the divided streams is continuous with the streams later being rejoined. This continuous flow is provided by the circular flow passage that allows the resin to flow around the left or right arm of the passage, without disruption, to the exit port. This is advantageous to an arcuate, but non-circular or non-closed loop, flow passage in which the inlet port is of a fixed location while the passage and the exit port are arcuately adjustable to vary the position of the view stripe. In the non-closed loop arrangement, if the exit port is adjusted and moved generally toward the inlet port, a portion of the arcuate passage will be caused to extend beyond the inlet port and begin to form a dead end passage on the side of the inlet port opposite the exit port. During use, the secondary resin would then flow into this dead end passage, stagnate and degregate.

A container formed according to the present invention will include a vertical stripe of a translucent resin extending along one side wall of the container, generally along the mold parting line formed on the container during blow molding. By positioning the view stripe on the mold parting line, a portion of the view stripe will end up as flash extending above and below the side wall. After blow molding, the flash is removed and the view stripe will conveniently end adjacent to the upper and lower ends of the side wall.

Any plastic resin which is suitable blow molding, and which can be utilized in either an opaque or translucent form, is within the purview of this invention. In a container produced by this invention, the opaque and translucent plastic resins must be compatible for joining together at the weld lines. In one of its forms, high density polyethylene, for both the opaque and translucent resins, produces a container with a view stripe through which the content level within the container can be readily ascertained.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE PREFERRED EMBODIMENT

Figure 1:
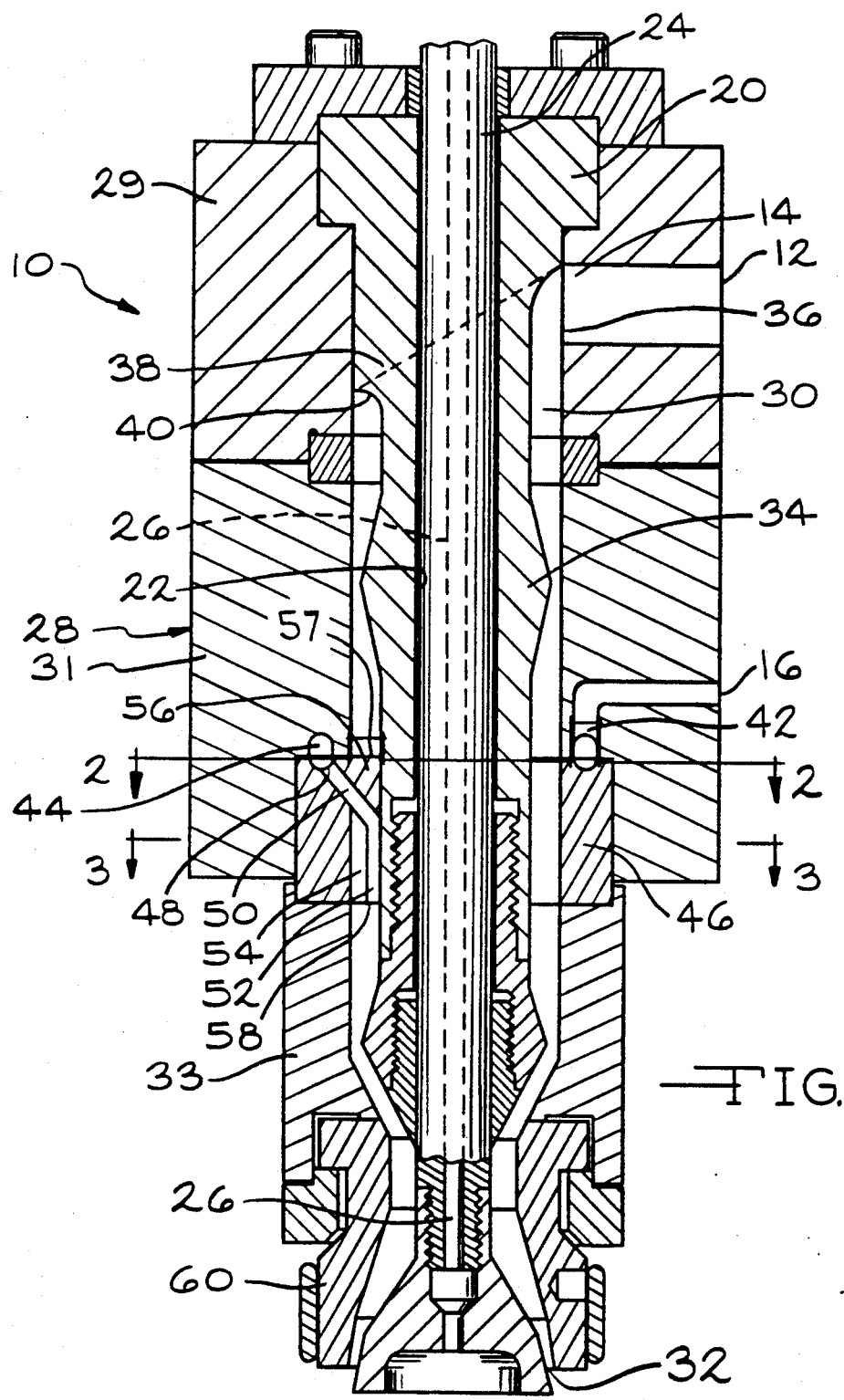
FIG. 1 is a longitudinal sectional view of an extrusion head assembly embodying the principles of the present invention and having an adjustable exit passage for the secondary resin.
Figure 2:
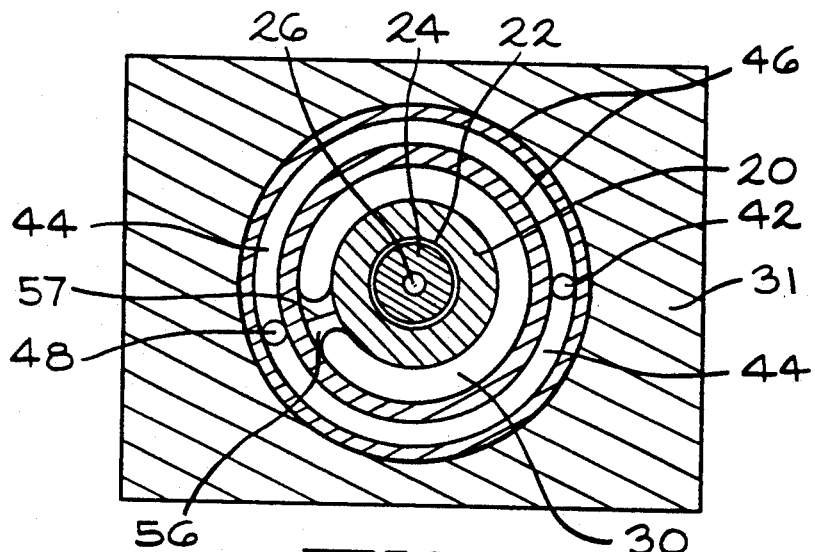
FIG. 2 is a sectional view taken substantially along line 2—2 in FIG. 1 illustrating the relationships of the secondary resin feed and exit ports.

Now with reference to the drawing, the apparatus of this invention, an extrusion head assembly with an externally adjustably positionable view stripe, is generally illustrated in FIG. 1 and designated at 10. The extrusion head assembly 10 is of the multi-cavity variety.

A manifold assembly (not shown) is used to separately supply a primary plastic resin and a secondary plastic resin to the extrusion head assembly 10. A primary extruder (not shown) is used to extrude the primary resin, first into the manifold assembly and then into a primary inlet 12 of the extrusion head assembly 10, beginning the formation of a parison. The primary resin is pigmented or opaque and flows from the primary inlet 12 through a primary flow channel 14 which further directs the flow of the primary resin into the extrusion head assembly 10.

A secondary natural resin, which is translucent and unpigmented, is similarly extruded by a secondary extruder (not shown). The secondary extruder is coupled by the manifold assembly to a secondary resin inlet and passageway 16 which is spaced below the primary inlet 12.

During operation of the extrusion head assembly 10, molten pigmented plastic resin is extruded into the extrusion head assembly 10. Similarly, molten unpigmented plastic resin is also extruded into the extrusion head assembly 10. As will be more fully understood from the description set out below, the unpigmented, translucent resin becomes positioned within the pigmented resin flow as the resins move through the extrusion head assembly 10.

The extrusion head assembly 10 of the present invention includes a cylindrical mandrel sleeve 20 which has an axial bore 22 extending therethrough. A mandrel 24 extends through the axial bore 22 and includes an air conduit 26 which extends axially therethrough. A die body 28 is supported in spaced apart relation around the mandrel sleeve 20 and defines an annular extrusion head cavity 30 therebetween. The extrusion head cavity 30 has an annular outlet orifice 32 at its lower end. As defined herein, the die body 28 includes an upper die body 29, a central die body 31, and a lower die body 33. A pressure ring 34, integrally formed with the mandrel sleeve 20, is used to balance internal pressures within the extrusion head cavity 30 thereby enhancing the axial component of movement in the primary resin flow and minimizing any rotational flow components therein.

At its upper end, the mandrel sleeve 20 also includes a radially, outwardly extending diverter segment 38. The diverter segment 38 includes a diverter surface 40 which faces axially downward toward the annular outlet orifice 32 and which defines an arcuate flow path for the primary resin. As the primary resin is fed from the primary flow channel 14 through an inlet orifice 36 and into the extrusion head cavity 30, the primary resin flow is divided into two streams which continuously and circumferentially flow in both directions around the mandrel sleeve 20. The diverter surface 40 directs the flow of the primary resin from a generally horizontal flow direction in the primary flow channel 14 to a substantially downward or vertical flow direction in the extrusion head cavity 30. The divided primary flow streams travel around the mandrel sleeve 20 and are rejoined at a position on a side of the mandrel sleeve 20 generally opposite of the inlet orifice 36.

The secondary resin is fed into the extrusion head assembly 10 at the secondary inlet 16 and then into a vertical conduit 42. At the lowermost end of the vertical conduit 42, the flow of secondary resin enters a horizontally positioned closed loop, preferably circular, flow passage 44. The circular flow passage 44 extends circumferentially around the extrusion head cavity 30 and the mandrel sleeve 20. As seen in FIG. 1, a portion of the central die body 31 defines the upper surfaces of the circular flow passage 44 while a portion of a rotatable adjustment ring 46 defines the lower surfaces of the circular flow passage 44. The adjustment ring 46 is further described below.

In the circular flow passage 44, the secondary resin flow is divided at the entrance into two flow streams which continuously flow in opposite directions around both sides or arms of the annular flow passage 44 from the vertical conduit 42 to an exit orifice 48. Since flow of the secondary resin is continuous and uninterrupted along both sides or arms of the circular flow passage 44, the result is that no stagnation pockets are developed in the flow of the secondary resin and degregation of the polymer is substantially reduced. This is the benefit of having a two armed or closed loop passage, such as the circular flow passageway 44, rather than an arcuate but non-closed loop passage. As mentioned above, in the non-closed loop flow passage, the fixed position of the inlet port and the adjustable position of the arcuate flow passage and exit port would allow for the development of a dead end passageway, on the side of the inlet port opposite the exit port, as the exit port is adjusted closer to the inlet port. Flow of the secondary resin into this dead end passage would result in development of a stagnation pocket and degregation of the resin.

Figure 3:
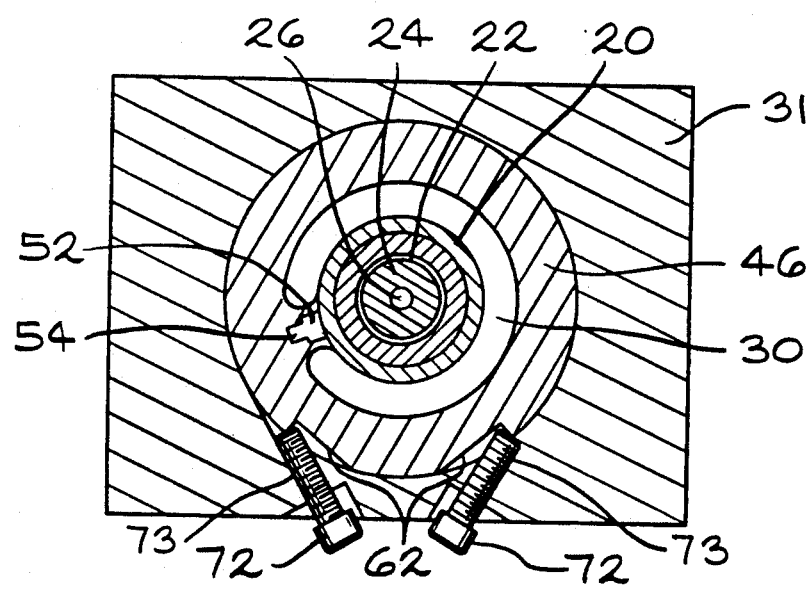
FIG. 3 is a sectional view taken substantially along line 3—3 in FIG. 1 illustrating the position adjustment assembly for the secondary resin exit port of the extrusion head assembly.

In the circular flow passage 44 of the present invention, the separate streams of the secondary resin are rejoined at an exit orifice 48. An exit passageway 50 extends from the exit orifice 48 and is directed generally downward and radially inward therefrom. The passageway 50 angularly extends through the adjustment ring 46 until approximately midway through the adjustment ring 46, although other positions could also be employed, where it becomes oriented substantially vertically downward. In the preferred embodiment, the vertical portion of the exit passage 50 is cross-sectionally shaped so that it has a wide portion 52 located radially inward of a narrow portion 54, thereby forming a substantially T-shaped section. As seen in FIG. 3, the mandrel sleeve 20 forms one wall portion of the T-shaped section.

A divider member 56 is positioned in the flow path of the primary resin to interrupt the downward flow of the primary resin through the extrusion head cavity 30. The divider member 56 is a substantially lenticular or arched shaped extension of the adjustment ring 46 and is also positioned so as to be vertically aligned with an outlet opening 58 of the exit passageway 50. The divider member 56 is shaped with an upwardly directed knife edge 57 to smoothly divide the downward primary resin flow through the extrusion head cavity 30 therearound.

As the secondary resin passes downward through the exit passageway 50 out through the outlet opening 58, the flow of secondary resin becomes encapsulated in the primary resin flow, which has been separated by the divider member 56, joining the divided streams of primary resin flow and resulting in a tubular parison. As such, the secondary resin forms welds along its sides where it joins with the primary resin.

The tubular parison is extruded through the annular outlet orifice 32 at the bottom of the extrusion head assembly 10.

The tubular parison consists primarily of the pigmented primary resin. However the view stripe of the secondary resin fully extends through the radial thickness of the parison wall. Because of the T-shape of the exit passageway 50, the secondary resin formed in the gap of the primary resin will exhibit a wider dimension along the inner circumferential surface of the parison than the outer circumferential surface of the parison thereby enhancing the shading or sharpness of the transition from the translucent secondary resin to the opaque primary resin.

Figure 4:
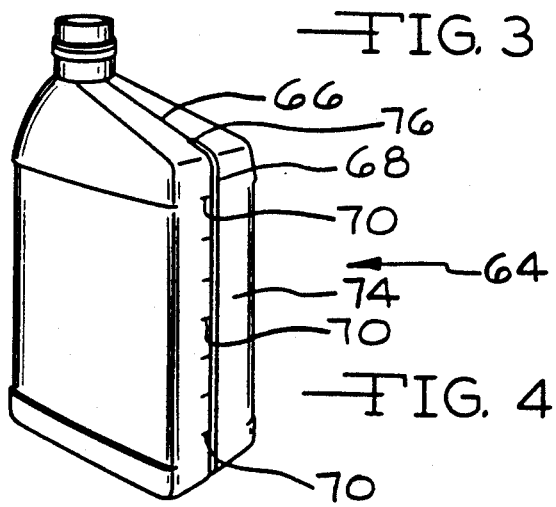
FIG. 4 is a perspective view of a finished container having a view stripe in the container side wall properly restricted to the mold parting line.

As the parison is extruded from the extrusion head assembly 10, the mold halves (not shown) are moved together to enclose the parison within a mold cavity (not shown). While the orientation of the parison and the view stripe relative to the mold halves is typically set to result in the production of a container 64 having a view stripe 68 formed along the mold parting line 66 (see FIG. 4), during the closing of certain style molds, in particular book molds of certain wheel-type blow molding machines, it has been found that rotation is induced in the parison resulting in a shifting of the view stripe 68 away from the mold parting lie 66.

With the parison rotated in the closed mold halves, blow molding of the container 64 results in the view stripe 68 deviating from the mold parting line 66. If the degree of departure from the mold parting line 66 is great enough, the resulting view stripe 68 may be formed over content level markings 70 or onto the front or rear side walls of a non-round container. Such a container is aesthetically undesirable for obvious reasons. The adjustment ring 46 of the present invention readily enables correction of any deviation of the view stripe 68 from the mold parting line 66. The amount of rotational correction needed for a specific blow molding machine and a specific pair of blow molds can be readily determined on a trial and error basis. Typically, only several adjustments will be necessary to properly align the view stripe 68 with mold parting line 66.

As seen in FIG. 3, the adjustment ring 46 is mounted for rotation within the central die body 31 of the extrusion head assembly 10. A pair of oppositely positioned notches 62 are formed in the adjustment ring 46. The notches 62 are respectively engaged by externally accessible set screws 72, angularly extending through at least partially threaded bores 73 in the central die body 31. By moving one of the set screws 72 outward and the other of the set screws 72 inward relative to the central die body 31, the position of the outlet opening 58 and the positioning of the view stripe 68 can be circumferentially adjusted in the tubular parison relative to die body 31 and the fixed position of the mold halves. Other specific mechanisms for rotating and positioning the adjustment ring 46 can also be employed. Rotation of the adjustment ring 46 does not alter the position of the vertical conduit or feed port 42 into the circular flow passage 44. During rotation of the adjustment ring 46, the divider member 56 will be correspondingly rotated and kept in alignment with the secondary resin exiting the outlet opening 58 to form the view stripe.

Because of the shape of the circular flow passage 44, changes in the circumferential position of the exit port 48, will not result in stagnation pockets being formed in the flow of the secondary resin such as would occur if the secondary flow passage 44 merely consisted of a non-closed loop arcuate passage having a single arm extending partially around the adjustment ring and the mandrel sleeve 20. The respective left and right arms of the circular flow passage 44 around the adjustment ring 46, defined as being those respective portions of the circular flow passage 44 between the feed port 42 and the exit port 48, will not interfere with flow of the secondary resin regardless of the positioning of the exit port 48. While the respective lengths of these left and right arms of the circular flow passage 44 may vary because of the exit port 48 positioning, the flow itself remains continuous without an dead ends or stagnation pockets even though the flow rates and flow times through the two arms are typically not equal.

By maintaining the view stripe 68 oriented with the mold parting line 66, as the mold halves are closed a portion of the view stripe 68 will extend between the mold halves as flash. Once the flash has been trimmed from the blown container 64, the view stripe 68 will extend straight up along the length of the parting line 66 and will conveniently terminate at 76 adjacent to the side wall 74 in the top and bottom portion of the container 70.

While the above description constitutes the preferred embodiment of the present invention, it will be appreciated that the invention is susceptible to modification, variation, and change without departing from the proper scope and fair meaning of the accompanying claims.

What is claimed is:

1. Apparatus for producing a tubular parison including a first plastic resin and having a longitudinal stripe of a second plastic resin, said longitudinal stripe extending radially through said tubular parison, said apparatus comprising:

a die body having a longitudinal axis, a mandrel sleeve being positioned within said die body and being spaced therefrom to define a tubular cavity, a die being positioned at one end of said die body and defining an annular parison outlet orifice from said cavity, a first inlet for directing said first plastic resin into said tubular cavity;

means for forming a division in said first plastic resin in said tubular cavity;

a second inlet for said second plastic resin, said second inlet terminating in a feed port;

means for directing said second plastic resin into said division in said first plastic resin, said second plastic resin joining together with said first plastic resin to thereby form said tubular parison in said cavity with a longitudinal stripe of said second plastic resin extending radially through said first plastic resin, said directing means including a circumferentially adjustable ring having portions at least partially defining a second plastic resin flow passage;

said second plastic resin flow passage forming a closed loop passage and being in communication with said feed port;

said ring including portions defining an exit port, said exit port being in communication with said second plastic resin flow passage and being circumferentially positionable with adjustment of said ring, adjustment of said ring and positioning of said exit port varying the circumferential position of said longitudinal stripe of said second plastic resin in said tubular parison and with respect to said die body; and externally operable means for circumferentially adjusting said ring.

2. An apparatus as set forth in claim 1 wherein said directing means is rotationally adjustable.

3. An apparatus as set forth in claim 1 wherein said exit port includes an exit passageway aligned with said division and directing said second plastic resin thereinto.

4. An apparatus as set forth in claim 1 wherein said feed port is fixedly positioned with respect to said die body.

5. An apparatus as set forth in claim 3 wherein said exit passageway is rotationally positionable with respect to said die body.

6. An apparatus as set forth in claim 1 wherein said second plastic resin flow passage is substantially circular.

7. An apparatus as set forth in claim 1 wherein said second plastic resin flow passage is at least partially formed in an upper surface of said ring.

8. Apparatus for producing a tubular parison for blow molding in a blow molding machine utilizing mold halves defining a mold cavity, said tubular prison including a first plastic resin having a longitudinal stripe of a second plastic resin, said longitudinal stripe extending radially through said tubular parison, said apparatus comprising:

a die body having a longitudinal axis, a mandrel sleeve being positioned within said die body and being spaced apart therefrom to define a tubular cavity, a die being positioned at one end of said die body and defining an annular parison outlet orifice from said cavity;

first inlet for directing said first plastic resin into said tubular cavity;

means operatively associated with said mandrel sleeve for directing said first plastic resin through said cavity around said mandrel sleeve and generally toward said annular outlet orifice;

means for creating a division in said first plastic resin;

a second inlet for said second plastic resin, directing means for directing said second plastic resin from said second inlet into said division in said first plastic resin, said directing means including a circumferentially adjustable ring having portions defining a closed loop flow passage in communication with said second inlet, said directing means also including portions defining an exit passageway in communication with said closed loop passage and located to direct said second plastic resin into said division thereby forming in said tubular cavity said parison of said first plastic resin having a longitudinal stripe of said second plastic resin extending radially therethrough; and an external adjustment means for varying the positioning of said longitudinal stripe in said tubular parison by adjusting the positioning of said ring and said exit passageway relative to said tubular cavity.

9. An apparatus as set forth in claim 2 wherein said adjustment means is rotationally adjustable for circumferentially positioning said longitudinal stripe in said tubular parison.

10. An apparatus as set forth in claim 9 wherein said longitudinal stripe is varied in circumferential position with respect to said tubular parison and said mold halves.

11. An apparatus as set forth in claim 10 wherein said longitudinal stripe is circumferentially varied to correspond with a mold parting line of said mold halves.

12. An apparatus as set forth in claim 8 wherein said closed loop flow passage is at least partially defined by said die body.

13. An apparatus as set forth in claim 12 wherein said closed loop flow passage is at least partially defined in an upper surface of said ring.

14. Apparatus for producing a tubular parison of a first plastic resin having a longitudinal stripe of a second plastic resin extending radially therethrough, said apparatus comprising:

a die body having a longitudinal axis, a mandrel sleeve being positioned within said die body and being spaced therefrom to define a tubular cavity, a die being positioned at one end of said die body and defining an annular parison outlet orifice from said cavity, a first inlet for directing said first plastic resin into said tubular cavity;

means for forming a division in said first plastic resin in said tubular cavity;

a second inlet for said second plastic resin; and means for directing said second plastic resin into said division in said first plastic resin thereby forming said tubular parison of said first plastic resin having a longitudinal stripe of said second plastic resin extending radially therethrough, said directing means including a rotationally adjustable ring having a portion defining a second plastic resin flow passage in communication with said second inlet, said ring also having portions defining an exit passageway in communication with said second plastic resin flow passage, said exit passageway being located for directing said second plastic resin into said division, a pair of adjustment notches being formed in said ring and a pair of externally accessible set screws extending through bores in said die body and engaging said notches such that by moving one of said set screws outward and the other of said set screws inward relative to said die body, said ring is rotationally adjusted varying the circumferential location of said exit passageway relative to said die body and the circumferential positioning of said longitudinal stripe within said tubular parison.

* * * * *